United States Patent [19]

Paulsson et al.

[11] Patent Number: 4,475,862
[45] Date of Patent: Oct. 9, 1984

[54] VEHICLE FOR THE TEMPORARY STORAGE OF WASTE

[75] Inventors: Bertil Paulsson, Lund; Aarno Kyander, Malmö, both of Sweden

[73] Assignee: B.A. Innovation Aktiebolag, Lund, Sweden

[21] Appl. No.: 375,284

[22] PCT Filed: Aug. 24, 1981

[86] PCT No.: PCT/SE81/00234
§ 371 Date: Apr. 23, 1982
§ 102(e) Date: Apr. 23, 1982

[87] PCT Pub. No.: WO82/00627
PCT Pub. Date: Mar. 4, 1982

[30] Foreign Application Priority Data

Aug. 26, 1980 [SE] Sweden ................................ 8005962

[51] Int. Cl.³ ............................................... B65F 3/00
[52] U.S. Cl. ...................................... 414/513; 180/291
[58] Field of Search ........... 414/509, 513, 517, 525 R, 414/679; 180/291, 292, 312; 280/786

[56] References Cited

U.S. PATENT DOCUMENTS 3,161,305 12/1964 Ferrari et al. ...................... 414/517
3,198,355 8/1965 Kamin ................................. 414/513
3,486,646 12/1969 O'Brien et al. .............. 414/525 R X
4,057,010 11/1977 Smith .......................... 414/525 R X Primary Examiner—Robert G. Sheridan
Attorney, Agent, or Firm—Roberts Spiecens & Cohen

[57] ABSTRACT

A vehicle for the temporary storage of refuse has a collecting section (12) which includes a basically vertical plate (20) which is moved in the longitudinal axis of the vehicle by a drive unit (21). The plate regulates the size of the storage space of the collecting section, so that during the feeding in of refuse, the feeding unit, located at the extreme rear of the vehicle, achieves the necessary compression of refuse. According to the invention, the frame of the vehicle is formed by the bottom part of the collecting section. Guiding and sliding units (35a,b) for the plate and a number of strengthening elements are also arranged in the collecting section. The strengthening sections assure the necessary mechanical stability in the bottom part and in planes through the guiding and sliding units. The guiding and sliding units preferably also serve as strengthening elements. In a preferred design, the bottom part is built up of a lower base plate (31) and two upper base plates (32a,b) joined by basically vertical wall sections (33a, b), so that the cross-section through the bottom part is like that of a channel.

6 Claims, 2 Drawing Figures

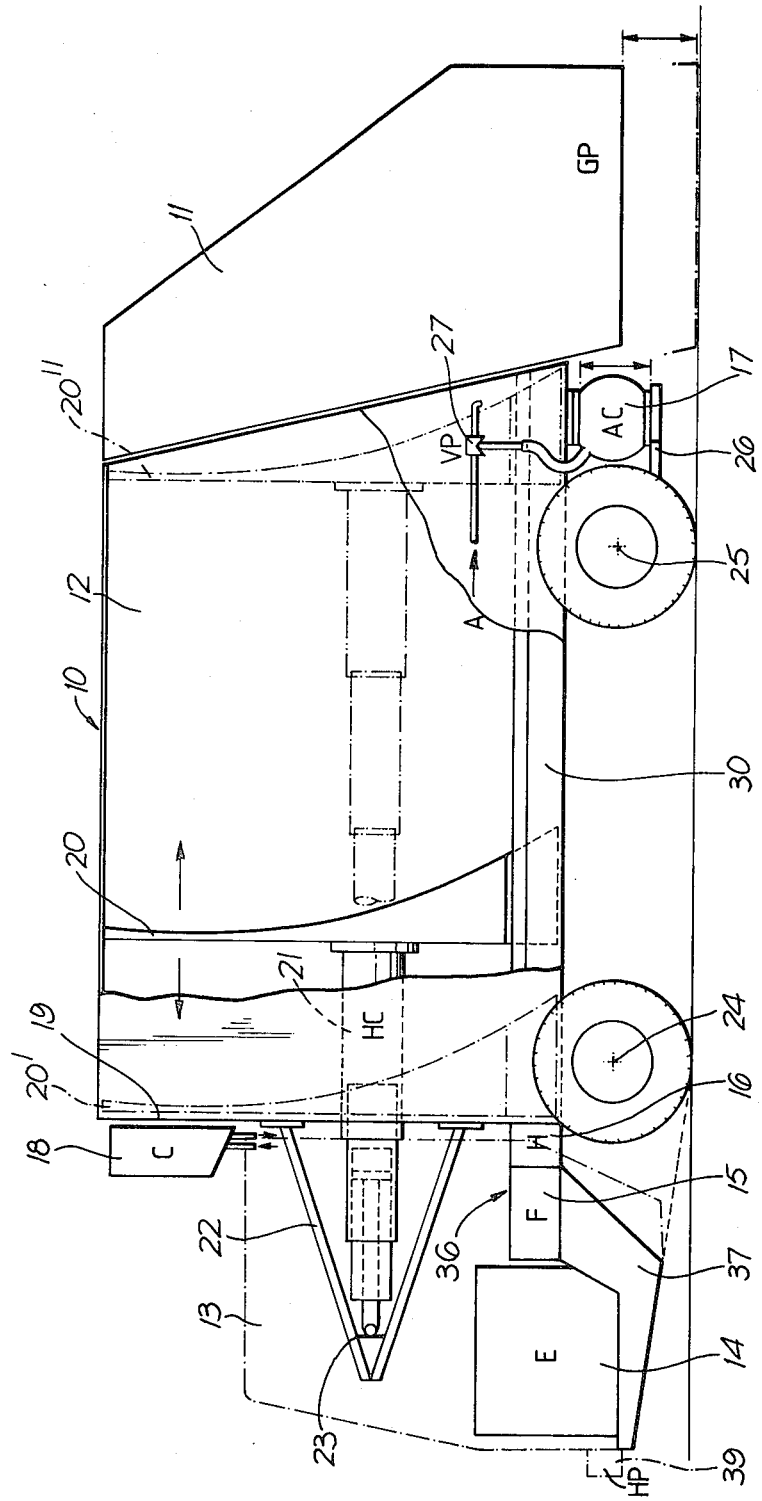

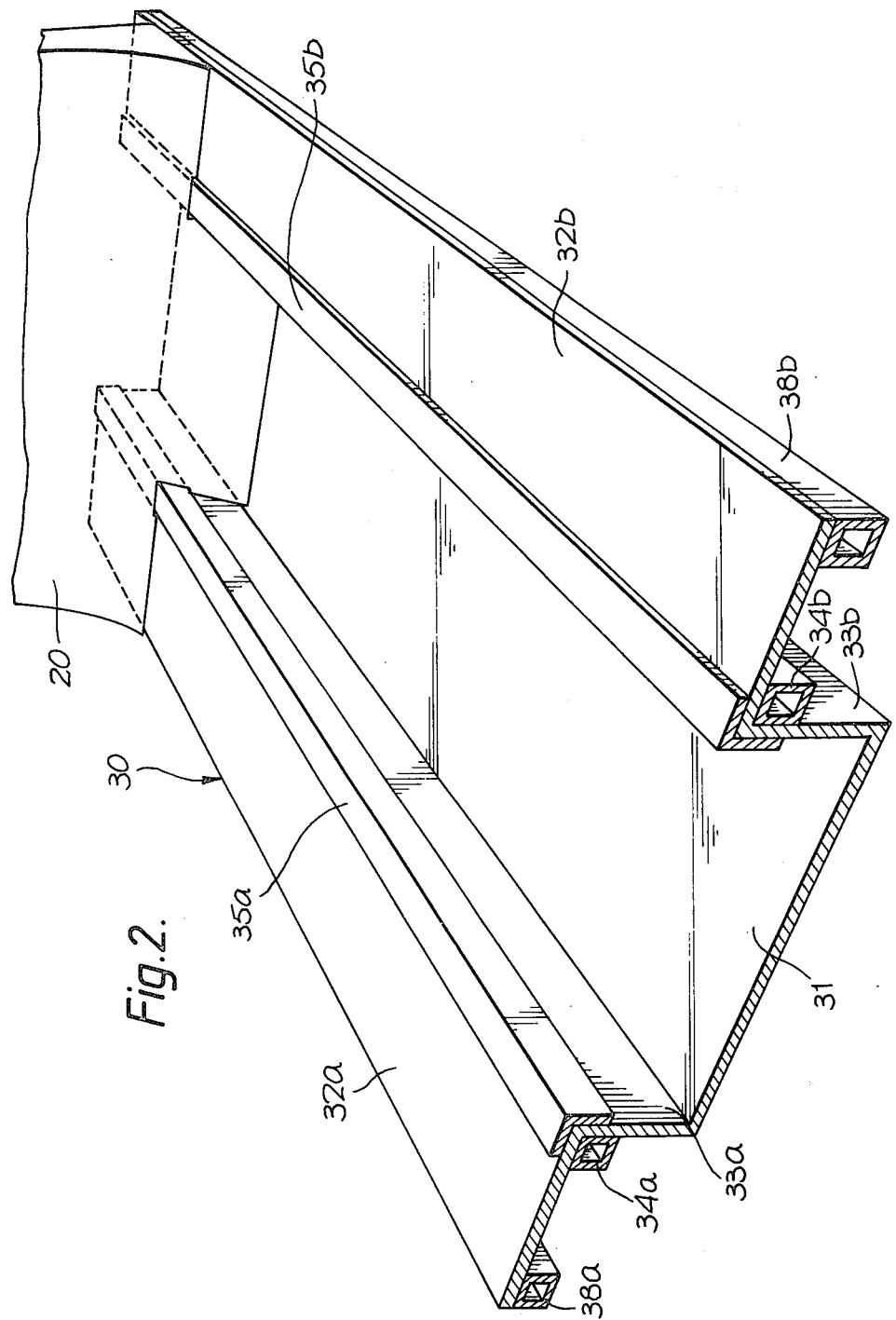

VEHICLE FOR THE TEMPORARY STORAGE OF WASTE

Vehicle for the temporary storage of waste, especially domestic refuse, comprising a collecting section for providing a storage space with generally rectangular section and substantially the same dimensions as the vehicle, said collecting section is provided with a standing plate reciprocable in said storage space by a drive unit for movement of said plate between a first position and a second position in the longitudinal direction of the vehicle in order to adapt said storage space of said collecting section to the volume of the waste stored in said space.

Accordance to existing technology, refuse, especially domestic refuse, is collected in a vehicle with a separate chassis onto which a collecting container is built. This is generally open to the rear, to work in conjunction with a feeding device. A vertical plate is provided in the container and this plate is moved in the longitudinal direction of the container by a drive unit. The movement of the plate is used for regulating the storage volume of the container and for discharging the contents of the container. The necessary reaction force for the compression of the refuse while it is being fed into the containing section is provided by adjusting the storage volume to the quantity of refuse. To discharge the refuse, the feeding device is moved out of the way by means of a moving unit, after which the plate presses out the refuse. The drive unit for the vertical plate is mounted in the collecting container, adjacent to the front wall of the container, so the vertical plate can be moved towards the front wall to a location, the distance of which from the front wall corresponds to the contracted length of the drive unit. Consequently, there is always a space at the front of the container that cannot be used for the storage of refuse.

The existing technology, involving the use of a vehicle, on the chassis of which additional equipment is built to receive refuse, results in a disproportionate part of the total weight of the vehicle being the unladen weight of the vehicle. The ratio of the load to the total weight of the vehicle is therefore small. Heavy deadweight and unutilized transport space naturally imply inferior handling economy.

One additional disadvantage in employing existing technology is that the centre of gravity of the vehicle is located at a high level, which detracts from the driving characteristics of the vehicle. The combination of a chassis with the collecting container built onto it contributes to the high level of the centre of gravity.

A further disadvantage of existing technology is that the collecting container is located relatively far to the rear of the vehicle, which, together with the loaction of the feeding device, at the opening of the container, i.e. far behind the rear axle of the vehicle, results in an unfavourable location of the centre of gravity of the vehicle, much too near the rear axle of the vehicle. Consequently, the axle loads are unsuitably distributed between the rear axle and the front axle. Because of axle load regulations, the maximum permissible load of the vehicle is reduced as a result of this distribution.

Refuse vehicles now in use are also difficult workplaces for refuse workers. The cab is at a high level and the driver is forced to make ergonomically incorrect movements to enter and leave the driver's seat on the many occassions this is required.

This invention is for a vehicle for the temporary storage of refuse, in which the disadvantages listed above have been eliminated.

According to the invention the collecting section of the vehicle is comprising a bottom part, said bottom part constitutes the frame of the vehicle and carries a number of front wheels below the first position of the standing plate and a number of rear wheels below the second position of said verticle plate, which bottom part being extended in front of a front wall of said collecting section and also the first position of said standing plate for supporting a driver's compartment, an engine, tanks for fuel and hydraulic oil and other such means, said bottom part being provided with a number of strengthening means extending in the longitudinal direction of the vehicle for providing mechanical strength to said bottom part and said collecting section, whereby a number of said strengthening means constitutes means for guiding and sliding of said standing plate.

In certain designs, the vehicle can be raised and lowered by rotation about the front axle of the vehicle. A drive unit, preferably a pneumatic one, is then provided adjacent to the rear part of the collecting section for regulating the position of the feeding device in the vertical direction. The regulation generally permits the feeding device to be lowered to the ground.

An advantage of this invention is that the bottom of the collecting container is located at a lower level than that achieved by existing technology. This is the case even without the use of the possibilities of regulating the level of the feeding device. The low level of the bottom of the container has several advantages for the loading height, centre of gravity, volume and the ratio of the load to the total weight of the vehicle.

In a typical application of the invention the collecting section of the vehicle has considerably increased cross-sectional area. Values of 10-20% are available.

The invention is described in greater detail in conjunction with the two figures, where FIG. 1 shows, in principle, a side elevation of a vehicle in accordance with the invention, FIG. 2 shows a perspective view of the bottom part of the collecting section.

FIG. 1 shows a vehicle 10, with a collecting section 12, confinined by a roof and walls in the usual manner. In the figure, the front wall is shown specially with the reference number 19. In the collecting section, a basically vertical plate 20 is provided and is movable between a forward position 20' and rear position 20". A drive unit 21, preferably a hydraulic unit, is provided, to move the plate. A mounting point 23, for the stationary part of the drive unit, is provided in front of the front wall of the collecting section. This is normally achieved by mounting unit 22 fixed at the front wall 19 and/or at the extended bottom part.

The figure also shows how a feeding unit 11 is connected to the rear part of the collecting section. In a preferred design, the feed unit can be raised and lowered and, in certain designs, the lower position of the feeding unit can be lowered to the ground. A drive unit 17, preferably an air cylinder, is provided between the rear part of the bottom part 30 and a mounting unit 26, the position of which is fixed in relation to the rear axle 25 of the vehicle, is connected to a three-way valve 27 for regulating the position of the rear part of the collecting section and, thus, the height at which the feeding unit is loaded. At its lowest position, the feeding unit rests on the ground. In regulating the position of the feeding unit, the drive unit 17 rotates the whole vehicle around the front axle 24 of the vehicle, at the same time as the distance between the bottom part 30 of the collecting section and the rear axle 25 of the vehicle changes.

The bottom part of the collecting section is also extended beyond the front wall 19, to form a support unit for the cab 13, engine 14, fuel tank 15 and hydraulic oil tank 16. A support unit 37 is attached below the extended bottom part 36 and this support unit 37 permits the provision of a long, low entrance and the low forward location of the engine, as shown in the figure.

To save space, a hydraulic pump 39 is also located in front of the engine 14, in addition to which, the radiator 18 is located in front of the front wall 19 and above the cab.

The bottom part 30 of the collecting section is shown in detail in FIG. 2, and consists, according to a preferred design, (see FIG. 2) of a lower base plate 31 and two upper base plates 32a,b. Two elements 33a,b, preferably forming vertical walls, connect two edges of the lower base plate with the two upper base plates, so that the cross-section of the bottom part is in the form of a channel. Guiding and sliding units 35a,b, are located at the transition between the elements and each base plate, and these guiding and sliding units are shown in the figure as tracks, which are preferably built as members, to increase the torsional stiffness and dimensional stability of the bottom part. Generally, special stability members, 34a,b; 38a,b, are also provided. At least two of the stabilising members are provided, perferably where the basically vertical elements meet the upper base plates.

Finally, FIG. 2 shows the lower part of the movable plate 20, the lower limit of which is matched to the section of the bottom part.

During use of a vehicle in accordance with the invention, plate 20 is moved in the empty collecting section to a position in the vicinity of the feeding unit 11. Refuse is fed into the collecting section through the feeding unit and, as the space in the collecting section is filled, the drive unit 21 moves the plate 20 towards the front wall of the collecting section, so that the space between the plate and the feed unit is adapted to the need to compress the refuse fed in. When the collecting section is full, the plate is basically up against the front wall 19. To empty the collecting section, the feeding unit 11 is moved out of the way and plate 20 presses the refuse out of the collecting section.

A distinguishing characteristic for the operation is that the distance between the guiding and sliding units 35 and the orientation of the units in relation to the plate remain unchanged, e.g. when negotiating rough ground or in the case of different quantities of refuse in the collecting section. As noted above, the guiding and sliding units are designed to have large mechanical stability, in addition to which, in certain typical applications, the dimensional stability and torsional stiffness of the collecting section is further increased by means of special stabilising members 34, 38. The tolerances between the plate 20 and the guiding and sliding units 35, may thus be relatively small, thus ensuring an efficient interaction between the plate on the one hand and the guiding and sliding units on the other hand. But the tolerances between the plate 20 and the other limits of the collecting section are relatively large, thus ensuring that any torsional movements of the collecting section, e.g. when negotiating uneven ground, will not cause the plate 20 to jam and obstruct its movement.

In a preferred design, the guiding and sliding units 35 are located adjacent to the bottom part 30, for which purpose one of the units is formed by the actual base plate or by adjacent sections of material which have been formed to provide a suitable cross-section for this region or, alternatively, the units are formed of separate units, e.g. members fixed to the inner confining surfaces of the collecting section. FIG. 2 shows the alternative with the guiding and sliding units consisting of members fixed to the inner confining surface of the collecting section. By designing the members as angle sections, as shown in the figure, with a section matched to the section of the transition between the vertical elements 33 and the upper base plates 32 and fix the angle sections to the elements and to the upper base plates, a considerable increase in the mechanical stability of the bottom part is achieved. The guiding and sliding units contribute thus to the mechanical stability required of the bottom part 30 when it forms the frame of the vehicle. In addition to demands on the mechanical stability of the bottom part, there are also demands on the torsional stiffness on planes through the guiding and sliding units and on an unchanged distance between the guiding and sliding units, even under varying loads. The arrangement of the guiding and sliding units just described has thus the effect of the units increasing the stability of the bottom part and thus the mechanical stability in the planes through the guiding and sliding units. The location and construction of the units thus contribute to the good driving characteristics of the vehicle and, at the same time, ensure that the plate can be moved in the collecting section 12.

The initial part of the description has already dealt with the advantages obtained and the function of the extension of the bottom part past the front wall 19. The location of the drive device 21 in front of the front wall, inside the cab, does not encroach on the space provided for the driver, since the drive device is located centrally, on the longitudinal axis of the vehicle. The bonnet is generally extended so that is also serves as protection for the drive device 21.

From the above description, it may also be seen that the invention provides a better distribution of the load between the axles of the vehicle than existing technology, because the location of the engine, fuel and hydraulic oil tanks, hydraulic pump, cooling unit and drive device for the plate involve a forward and downward displacement of the centre of gravity of the vehicle.

In addition to the description, the invention is made clear by the following patent claims.

We claim:

1. A vehicle for the temporary storage of waste comprising a collecting section of box-shape defining a storage space of generally rectangular section and substantially the same dimensions as the vehicle, a standing plate supported in said storage space for movement, in the longitudinal direction of the vehicle, between a first forward end position and a second rearward end position to adopt said storage space of the collecting section to the volume of the waste stored in said space, drive means for moving said standing plate between said first and second positions, said collecting station constituting the body and frame of the vehicle and comprising a bottom part forming the frame of the vehicle, front wheels carried by said bottom part below said first position of the standing plate, rear wheels carried by said bottom part below said second position of the standing plate and a front wall on said bottom part, said bottom part being formed as a plate-shape element of channel section including a horizontal lower base plate, opposed vertical walls joined to the lower base plate at the longitudinal edges thereof, and horizontal outwardly extending upper base plates joined to the vertical walls at the upper edges thereof, said standing plate including a central portion which is supported between the vertical walls of the bottom part, and side parts which are supported above the upper base plates of the bottom part, reinforcing means on said bottom part extending longitudinally at the juncture of the vertical walls and said upper base plates, said reinforcing means including portions overlapping said vertical walls and said upper base plates to reinforce the same and to provide means for sliding and guiding of said central portion and side parts of said standing plate thereon, said bottom part further including a portion extending longitudinally in front of said front wall and forwardly of said front wheels for supporting a driver's compartment.

2. A vehicle as claimed in claim 1 wherein said drive means is connected to said standing plate at the front thereof and extends forwardly for connection in said passenger compartment.

3. A vehicle as claimed in claim 2 wherein said drive means is connected to said standing plate at an intermediate elevation thereof.

4. A vehicle as claimed in claim 3 wherein said intermediate elevation is substantially at mid-height of the standing plate.

5. A vehicle as claimed in claim 3 wherein said drive means is located in entirely in front of the front wheels with the standing plate in said first forward end position.

6. A vehicle as claimed in claim 1 wherein said reinforcing means comprises angle members at the juncture of the vertical walls and the upper base plates, said angle members having legs forming said portions which overlap the vertical walls and upper base plates, said standing plate riding on said legs of the angle members.

* * * * *